(12) United States Patent
Bishop, III et al.

(10) Patent No.: US 12,132,753 B2
(45) Date of Patent: Oct. 29, 2024

(54) ENHANCED NETWORK SECURITY BASED ON INTER-APPLICATION DATA FLOW DIAGRAMS

(71) Applicant: Bank of America Corporation, Charlotte, NC (US)

(72) Inventors: Jack Bishop, III, Evanston, IL (US); Adam B. Richman, Charlotte, NC (US); David Mortman, Worthington, OH (US)

(73) Assignee: Bank of America Corporation, Charlotte, NC (US)

( * ) Notice: Subject to any disclaimer, the term of this patent is extended or adjusted under 35 U.S.C. 154(b) by 954 days.

(21) Appl. No.: 17/021,262

(22) Filed: Sep. 15, 2020

(65) Prior Publication Data
US 2022/0086183 A1 Mar. 17, 2022

(51) Int. Cl.
*H04L 9/40* (2022.01)
*G06F 9/54* (2006.01)
(Continued)

(52) U.S. Cl.
CPC .......... *H04L 63/1433* (2013.01); *G06F 9/547* (2013.01); *G06F 11/302* (2013.01);
(Continued)

(58) Field of Classification Search
CPC ...... G06F 11/302; G06F 9/547; G06F 18/214; G06F 18/22; G06F 16/2379; G06N 20/00; H04L 63/1433
(Continued)

(56) References Cited

U.S. PATENT DOCUMENTS

| | | | |
|---|---|---|---|
| 5,359,711 A | 10/1994 | Hartmann et al. | |
| 6,658,391 B1 * | 12/2003 | Williams | ........... G06Q 30/0203 705/1.1 |

(Continued)

FOREIGN PATENT DOCUMENTS

| | | | | |
|---|---|---|---|---|
| WO | WO-2014102700 A1 * | 7/2014 | ........... | G05B 19/056 |

OTHER PUBLICATIONS

A task graph based application framework for mobile ad hoc networks Published in: 2002 IEEE International Conference on Communications. Conference Proceedings. ICC 2002 (Cat. No. 02CH37333) (vol. 5, pp. 3279-3283 vol. 5) Authors: Wang Ke • P. Basu • T.D.C. Little (Year: 2002).*

*Primary Examiner* — Melvin H Pollack
(74) *Attorney, Agent, or Firm* — Banner & Witcoff, Ltd.

(57) ABSTRACT

Aspects of the disclosure relate to enhanced network security based on inter-application data flows. A computing platform may monitor, via application programming interfaces, data transmissions between applications. Subsequently, the computing platform may retrieve one or more of a time of the data transmission, a source of the data transmission, and a destination of the data transmission. Then, the computing platform may generate a structured database where a pair of components of the database are dynamically linked to one another when the pair of components corresponds to a source and a destination for a data transmission. Subsequently, the computing platform may train a machine learning model to detect structural patterns within the structured database. Then, the computing platform may generate clusters indicative of similar application profiles. Then, the computing platform may predict an impact of a change in an application profile of an application of the plurality of applications.

20 Claims, 4 Drawing Sheets

(51) Int. Cl.
  *G06F 11/30* (2006.01)
  *G06F 16/23* (2019.01)
  *G06F 18/214* (2023.01)
  *G06F 18/22* (2023.01)
  *G06N 20/00* (2019.01)

(52) U.S. Cl.
  CPC ........ *G06F 16/2379* (2019.01); *G06F 18/214* (2023.01); *G06F 18/22* (2023.01); *G06N 20/00* (2019.01)

(58) Field of Classification Search
  USPC ......................................................... 726/25
  See application file for complete search history.

(56) References Cited

U.S. PATENT DOCUMENTS

| | | | |
|---|---|---|---|
| 6,697,824 B1 * | 2/2004 | Bowman-Amuah | ........................ G06F 16/958 707/E17.116 |
| 6,839,680 B1 * | 1/2005 | Liu | ........................ G06Q 30/02 705/7.33 |
| 6,937,493 B2 | 8/2005 | Krause et al. | |
| 6,965,938 B1 * | 11/2005 | Beasley | .............. H04L 67/1001 709/248 |
| 7,130,807 B1 * | 10/2006 | Mikurak | .......... G06Q 10/06375 705/7.31 |
| 7,281,015 B2 | 10/2007 | Brown et al. | |
| 7,286,854 B2 | 10/2007 | Ferrato et al. | |
| 7,379,880 B1 * | 5/2008 | Pathria | ............... G06Q 30/0603 705/1.1 |
| 7,424,439 B1 * | 9/2008 | Fayyad | .................. G06Q 30/02 705/7.33 |
| 7,433,836 B1 * | 10/2008 | August | .................. G06Q 20/14 705/30 |
| 7,433,852 B1 * | 10/2008 | Bertrand | ................. G06F 9/453 717/124 |
| 7,617,240 B2 * | 11/2009 | Guyan | ............. G06Q 10/06316 707/999.107 |
| 7,624,448 B2 | 11/2009 | Coffman | |
| 7,739,407 B1 * | 6/2010 | Pakkala | .............. G06F 16/9577 709/246 |
| 8,024,213 B1 * | 9/2011 | Fano | .................. G06Q 30/0201 705/7.29 |
| 8,091,065 B2 | 1/2012 | Mir et al. | |
| 8,312,549 B2 | 11/2012 | Goldberg et al. | |
| 9,485,132 B2 | 11/2016 | Nalam et al. | |
| 9,692,789 B2 | 6/2017 | Kirti et al. | |
| 9,832,067 B2 | 11/2017 | Dubsky et al. | |
| 9,954,884 B2 | 4/2018 | Hassell et al. | |
| 10,270,796 B1 * | 4/2019 | Veeraswamy | ....... H04L 63/1433 |
| 10,341,374 B1 | 7/2019 | Sadaghiani et al. | |
| 10,419,450 B2 | 9/2019 | Muddu et al. | |
| 10,673,880 B1 | 6/2020 | Pratt et al. | |
| 10,681,068 B1 | 6/2020 | Galliano et al. | |
| 11,010,700 B2 * | 5/2021 | Keen | ............... G06Q 10/063114 |
| 11,080,336 B2 * | 8/2021 | Van Dusen | ............. G06Q 10/10 |
| 11,172,046 B2 * | 11/2021 | Jugovic | ................. G06F 16/437 |
| 11,531,446 B1 * | 12/2022 | Kakaire | ................ G06Q 30/04 |
| 11,537,668 B2 * | 12/2022 | Rapp | ....................... G06F 16/93 |
| 11,544,644 B2 * | 1/2023 | Wilde | .................... G06Q 10/06 |
| 11,620,656 B2 * | 4/2023 | Hayes | ................ G06Q 30/0201 705/7.29 |
| 11,726,796 B2 * | 8/2023 | Thigpen | ................ G06F 11/302 713/1 |
| 11,888,895 B2 * | 1/2024 | Abzug | .................... G06F 21/56 |
| 2004/0130944 A1 | 7/2004 | Krause et al. | |
| 2006/0004790 A1 | 1/2006 | Brown et al. | |
| 2006/0148524 A1 | 7/2006 | Ferrato et al. | |
| 2008/0109470 A1 | 5/2008 | McGee | |
| 2011/0179160 A1 * | 7/2011 | Liu | ..................... G06F 11/3476 709/224 |
| 2015/0319220 A1 | 11/2015 | Dubsky et al. | |
| 2015/0326424 A1 | 11/2015 | Nalam et al. | |
| 2017/0195240 A1 * | 7/2017 | Chen | ....................... H04L 45/70 |
| 2017/0251013 A1 * | 8/2017 | Kirti | ....................... H04L 63/20 |
| 2017/0308568 A1 * | 10/2017 | Laethem | ................... G06F 8/65 |
| 2018/0205751 A1 * | 7/2018 | Howie | .................. G06F 21/552 |
| 2019/0147161 A1 | 5/2019 | Agarwal | |
| 2019/0196938 A1 * | 6/2019 | Mathen | ................. G06F 18/295 |
| 2020/0302050 A1 * | 9/2020 | Jain | ....................... G06F 9/5072 |
| 2021/0182381 A1 * | 6/2021 | Adams | .................... H04L 67/02 |
| 2021/0185059 A1 * | 6/2021 | Achleitner | ............ H04L 43/028 |
| 2024/0054569 A1 * | 2/2024 | Gutsell | .................. G06Q 40/08 |

\* cited by examiner

ENHANCED NETWORK SECURITY BASED ON INTER-APPLICATION DATA FLOW DIAGRAMS

BACKGROUND

Aspects of the disclosure relate to deploying digital data processing systems to create and/or manage data structures. In particular, one or more aspects of the disclosure relate to enhanced network security based on inter-application data flow diagrams.

Enterprise organizations may utilize various resources to support their computing infrastructure. For large enterprise organizations, maintaining, updating, and managing network activity over the various enterprise resources may be of significant importance in protecting confidential information and/or other sensitive data that is created, transmitted, and/or used for various purposes. It may be helpful to analyze data flow between applications to identify anomalies in data transmission. As data flows through the network in real-time, such detection and management of network activity may be time-sensitive and there may be significant advantages for the detection and management to be performed in real-time as well. Ensuring that discrepancies in data flow are detected, and timely and targeted remediation measures are performed, in real time with speed and accuracy, may be particularly advantageous to ensure a smooth running of an enterprise infrastructure. In many instances, however, it may be difficult to analyze data flow, in an organization's complex network comprising a vast number of network devices and users, while also attempting to optimize network resources, bandwidth utilization, and efficient operations of the computing infrastructure.

SUMMARY

Aspects of the disclosure provide effective, efficient, scalable, fast, reliable, and convenient technical solutions that address and overcome the technical problems associated with enhanced network security based on inter-application data flow diagrams.

In accordance with one or more embodiments, a computing platform having at least one processor, and memory storing computer-readable instructions that, when executed by the at least one processor, cause the computing platform to monitor, via a computing device and over a network environment and for a plurality of applications, one or more data transmissions associated with the plurality of applications, where the monitoring is performed at one or more application programming interfaces associated with the plurality of applications. Subsequently, the computing platform may retrieve, by the computing device and for a data transmission of the one or more data transmissions, a transmission attribute comprising one or more of a time of the data transmission, a source of the data transmission, and a destination of the data transmission. Then, the computing platform may generate, by the computing device and based on the transmission attribute, a structured database comprising components and links, where a pair of components of the database are dynamically linked to one another when the pair of components corresponds to a source and a destination for a data transmission between the pair of components. Subsequently, the computing platform may train a machine learning model to detect structural patterns within the structured database. Then, the computing platform may generate, based on the detected structural patterns, clusters indicative of similar application profiles. Then, the computing platform may predict, based on the generated clusters, an impact of a change in an application profile of an application of the plurality of applications.

In some embodiments, the computing platform may generate, via the computing device, a visual representation of the structured database, where the visual representation comprises blocks associated with components of the database, and an edge between a pair of blocks associated with a link between the pair of components corresponding to the pair of blocks. Then, the computing platform may provide, via an interactive graphical user interface, the visual representation of the database, wherein the visual representation comprises zoom-in and zoom-out features.

In some embodiments, the structured database may be query-able, and the computing platform may query the structured database for information related to one or more of an application, a suite of applications, a cluster, a security profile, an application profile.

In some embodiments, the computing platform may update the structured database in nearly real-time.

In some embodiments, the computing platform may detect, based on the structured database, potential security vulnerabilities.

In some embodiments, the components of the structured database may include one or more of the plurality of applications, databases, memory, CPU, and user interfaces, associated with the plurality of applications.

In some embodiments, the computing platform may detect a change in the networked environment. Then, the computing platform may update the structured database based on the detected change.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

An enterprise network management infrastructure may deploy computing resources such as network devices, web resources, electronic mail applications, external vendor applications, and so forth. A large amount of data (including machine-generated data) may be exchanged between such applications. In some instances, such data transmissions, unless adequately monitored, may pose a large security threat to the enterprise services. For large enterprise organizations with vast amounts of deployed resources and a large number of employees, data transmissions may take varied and complex forms, and may require real-time monitoring.

The problem of identifying inter-application data-flow and control-flow affects the ability to respond to application security events, and some of the implications may be that a timely root-cause-analysis is affected, affected systems are insufficiently identified and assessed for risk, and application of compensating security controls may become less-effective and more-costly (time, human, financial investment) than permissible limits.

Generally, it may not be possible to manually manage such a vast array of network users and devices, with near-continuous flow of data. Accordingly, it may be of great significance for a large enterprise organization (e.g., financial institution), with large amounts of confidential information to protect, to detect, in real-time, anomalous data transmissions, and to trigger appropriate security measures. As described herein, understanding an architecture of the flow of data transmissions may provide a structural landscape of the data transmissions, indicate nearest neighbors for various applications, detect inter-application dependencies, identify resource usage, and predict potential security vulnerabilities based on the landscape. Moreover, applications with similar operational neighborhoods may be identified and mitigation may be tailored based on a threat landscape and an application neighborhood.

Accordingly, aspects of this disclosure relate to automated identification of inter-application considerations for holistic threat models that may be designed around an application portfolio, including interconnectedness, so that compensating controls may be determined and applied more adequately. In particular, some aspects of this disclosure relate to monitoring of source and destination information for data transmissions to identify potential security vulnerabilities in real-time, and initiate actions to mitigate such activities. Identifying such potential security vulnerabilities via a manual process and/or based on mental steps is unlikely because it relates to vast amounts of real-time network data traffic, and such network data traffic is rapidly changing in real-time over thousands of enterprise resources. Generating a model for this architecture manually may take a long time, and when completed, new applications and/or APIs may have been added, thereby making the model incomplete and/or redundant. Moreover, it may not be humanly possible to detect all possible inter-application connections.

Also, since the network data may reside and/or be exchanged over a vast array of users, internal and external applications, and network devices, it necessitates a use of computing devices to access the information associated with the plurality of data transmissions over networks, detect patterns and/or anomalous behaviors in real-time as the data is sent, received, and/or dropped, and initiate relevant action in real-time and over the network. It may be noted, that as data transmissions occur over a computing network, the problem of detecting potentially harmful activities across an enterprise infrastructure arises in the realm of networks, and as described herein, a solution is necessarily rooted in computer technology to overcome a problem arising in the realm of computer networks.

Figure 1A:
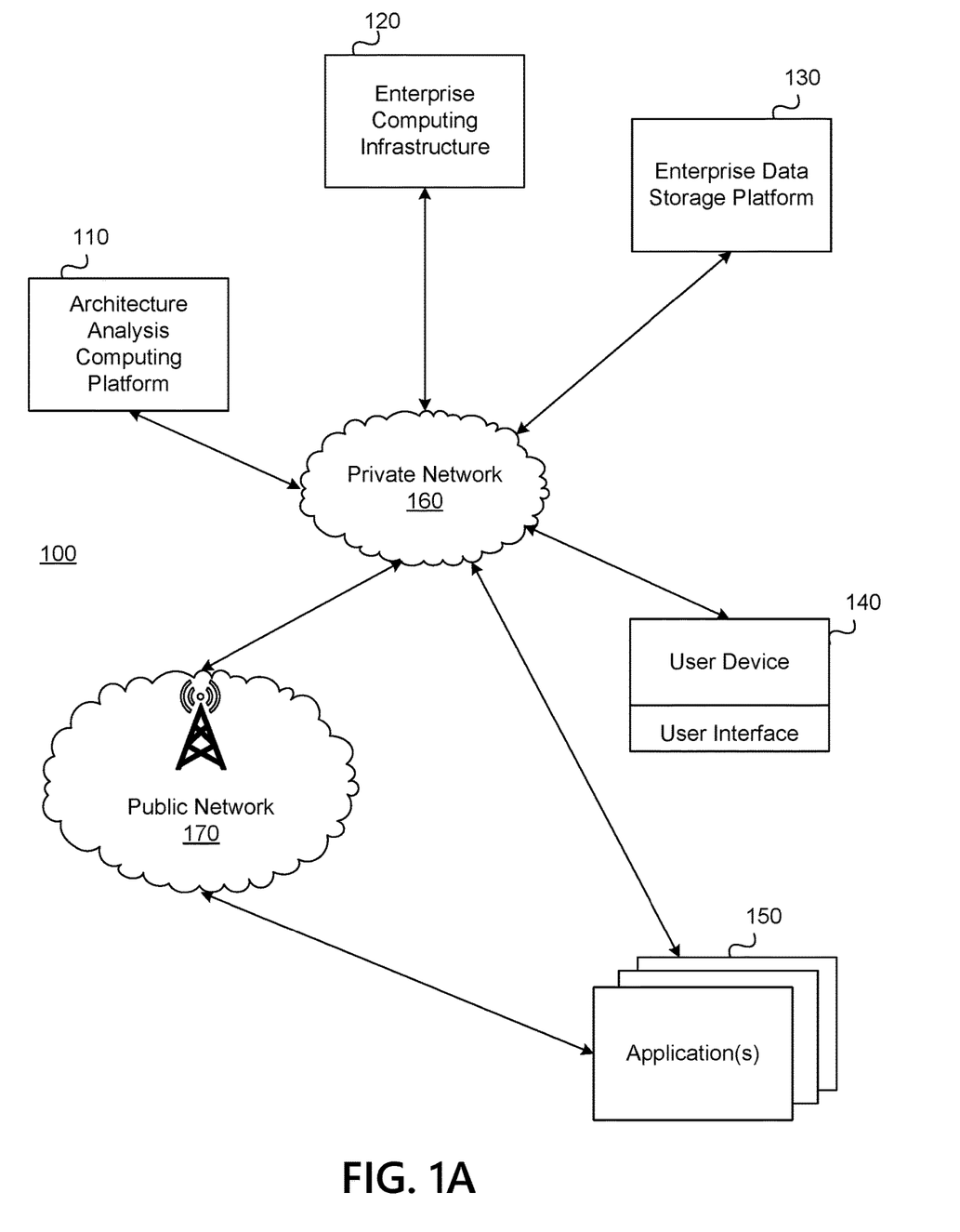
FIGS. 1A and 1B depict an illustrative computing environment for enhanced network security based on inter-application data flow diagrams.
Figure 1B:
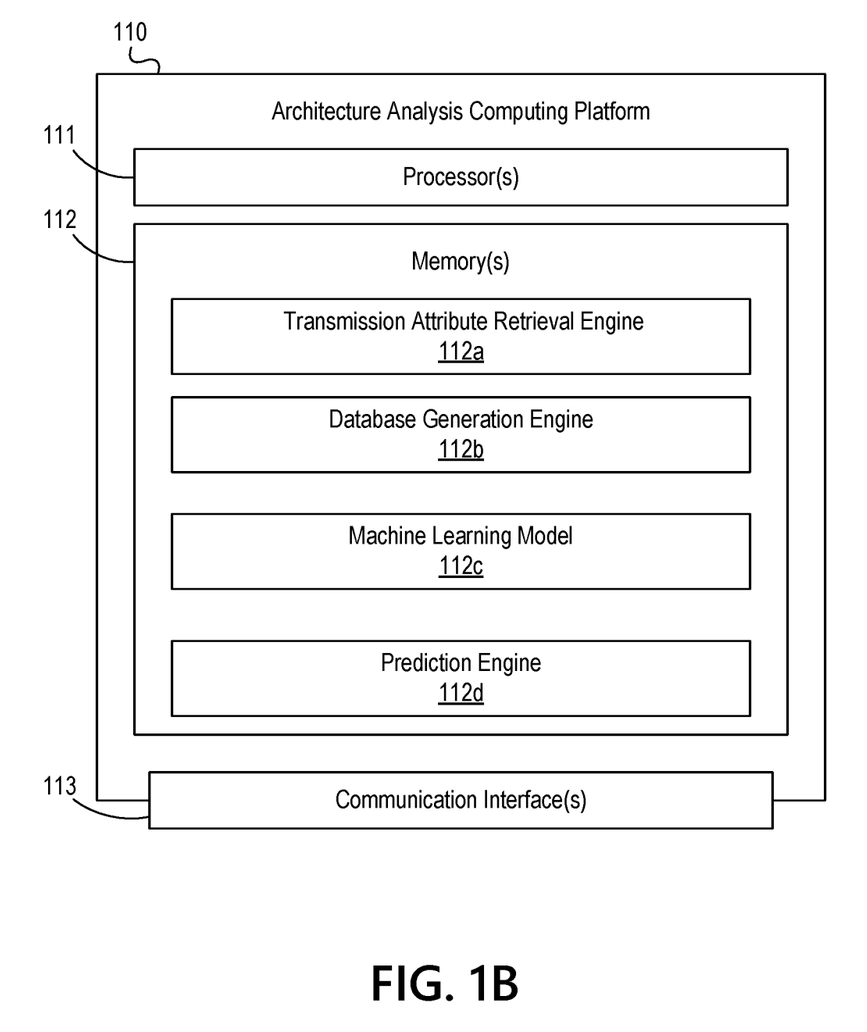

FIGS. 1A and 1B depict an illustrative computing environment for enhanced network security based on inter-application data flow diagrams. Referring to FIG. 1A, computing environment 100 may include one or more computer systems. For example, computing environment 100 may include an architecture analysis computing platform 110, enterprise computing infrastructure 120, an enterprise data storage platform 130, user device 140 (including a user interface), and applications 150.

As illustrated in greater detail below, architecture analysis computing platform 110 may include one or more computing devices configured to perform one or more of the functions described herein. For example, architecture analysis computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more user devices and/or user interfaces, for example, associated with user device 140. Also, for example, enterprise computing infrastructure 120 may be configured to host, execute, and/or otherwise provide one or more applications 150 associated with an enterprise organization. In some instances, enterprise computing infrastructure 120 may be configured to provide various enterprise and/or back-office computing functions for an enterprise organization. For example, enterprise network management infrastructure 120 may include various servers and/or databases that store and/or otherwise maintain account information, such as financial account information including account balances, transaction history, account owner information, and/or other information. Also, for example, enterprise computing infrastructure 120 may include various servers and/or databases that may manage information technology resources for the enterprise organization. For example, enterprise computing infrastructure 120 may include various servers and/or databases that may manage access controls to enterprise network devices. Additionally, or alternatively, enterprise computing infrastructure 120 may receive instructions from architecture analysis computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. For example, enterprise data storage platform 130 may be configured to store and/or otherwise maintain information associated with data transmissions between applications 150. Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

User device 140 may be an enterprise computing device, such as, associated with a personal computing device (e.g., desktop computer, laptop computer) or mobile computing device (e.g., smartphone, tablet) User device 140 may be a device on, and/or having access to, private network 160, of an enterprise organization. In addition, user interface associated with user device 140 may be linked to and/or used by a specific enterprise user (e.g., an employee of an organization operating architecture analysis computing platform 110). Also, for example, user interface associated with user device 140 may be configured to interact with the enterprise user, receive a query, and provide one or more search results in response to the query. In some embodiments, the user interface may provide an interface for applications 160. For example, when applications 160 Is a word processing application, then the user interface may provide the window where text may be input, edited, and so forth. In other aspects, the user interface may provide a visualization of an architectural model generated as described herein.

Applications 150 may be applications utilized by the enterprise organization, and managed, hosted, executed, and/or otherwise provided by enterprise computing infrastructure 120. For example, applications 150 may be a financial application, an accounting application, a travel reservation related application, an expense management application, a word processing application, a telecommunications application, and so forth. The term "enterprise application" as used herein, may generally refer to any application used within an enterprise organization. For example, an enterprise application may be a stand-alone application, or a suite of applications. For example applications 160 may include a suite of applications, such as, a word processing application, an electronic mail application, a video teleconferencing application, a and so forth. Also, for example, applications 150 may relate to billing and invoicing systems, payment processing systems, security investigation and mitigation systems, payroll systems, human resource systems, sales related platforms, production environment systems, product design and control systems, enterprise planning systems, enterprise resource management systems, web services hosting platforms, networks management tools, legal function management platforms, and so forth. In some embodiments, architecture analysis computing platform 110 may utilize one or more application programming interface (API) gateways associated with applications 150 to monitor data transmissions.

Computing environment 100 also may include one or more networks, which may interconnect one or more of architecture analysis computing platform 110, enterprise computing infrastructure 120, enterprise data storage platform 130, user device 140 (including a user interface), and applications 150. For example, computing environment 100 may include a private network 160 (which may, e.g., interconnect architecture analysis computing platform 110, enterprise computing infrastructure 120, enterprise data storage platform 130, user device 140, and/or one or more other systems which may be associated with an organization) and public network 170 (which may, e.g., interconnect applications 150 with private network 160 and/or one or more other systems, public networks, sub-networks, and/or the like). In some embodiments, public network 170 may be a high generation cellular network, such as, for example, a 5G or higher cellular network. In some embodiments, private network 160 may likewise be a high generation cellular enterprise network, such as, for example, a 5G or higher cellular network. In some embodiments, computing environment 100 also may include a local network (which may, e.g., user device 140 and one or more other devices with each other).

In one or more arrangements, enterprise computing infrastructure 120, enterprise data storage platform 130, user device 140 (including a user interface), and applications 150, and/or the other systems included in computing environment 100 may be any type of computing device capable of receiving input via a user interface, and communicating the received input to one or more other computing devices. For example, enterprise computing infrastructure 120, enterprise data storage platform 130, user device 140 (including a user interface), and applications 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of architecture analysis computing platform 110, enterprise computing infrastructure 120, enterprise data storage platform 130, user device 140 (including a user interface), and applications 150, may, in some instances, be special-purpose computing devices configured to perform specific functions.

Referring to FIG. 1B, architecture analysis computing platform 110 may include one or more processors 111, memory 112, and communication interface 113. A data bus may interconnect processor 111, memory 112, and communication interface 113. Communication interface 113 may be a network interface configured to support communication between architecture analysis computing platform 110 and one or more networks (e.g., network 150, network 160, a local network, or the like). Memory 112 may include one or more program modules having instructions that when executed by processor 111 cause architecture analysis computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of architecture analysis computing platform 110 and/or by different computing devices that may form and/or otherwise make up architecture analysis computing platform 110. For example, memory 112 may have, store, and/or include a transmission attribute retrieval engine 112a, a database generation engine 112b, a machine learning model 112c, and a prediction engine 112d.

Transmission attribute retrieval engine 112a may have instructions that direct and/or cause architecture analysis computing platform 110 to monitor, via a computing device and over a network environment and for a plurality of applications, one or more data transmissions associated with the plurality of applications, where the monitoring is performed at one or more application programming interfaces associated with the plurality of applications, as discussed in greater detail below. In some embodiments, transmission attribute retrieval engine 112a may have instructions that direct and/or cause architecture analysis computing platform 110 to retrieve, by the computing device and for a data transmission of the one or more data transmissions, a transmission attribute comprising one or more of a time of the data transmission, a source of the data transmission, and a destination of the data transmission.

Database generation engine 112b may have instructions that direct and/or cause architecture analysis computing platform 110 to generate, by the computing device and based on the transmission attribute, a structured database comprising components and links, where a pair of components of the database are dynamically linked to one another when the pair of components corresponds to a source and a destination for a data transmission between the pair of components. In some embodiments, database generation engine 112b may have instructions that direct and/or cause architecture analysis computing platform 110 to classify, by the computing device and based on a machine learning model, the one or more database commands into clusters, where database commands in a given cluster perform operations similar to one another.

Machine learning model 112c may have instructions that direct and/or cause architecture analysis computing platform 110 to train a machine learning model to detect structural patterns within the structured database. In some embodiments, machine learning model 112c may have instructions that direct and/or cause architecture analysis computing platform 110 to generate, based on the detected structural patterns, clusters indicative of similar application profiles.

Prediction engine 112d may have instructions that direct and/or cause architecture analysis computing platform 110 to predict, based on the generated clusters, an impact of a change in an application profile of an application of the plurality of applications.

Figure 2:
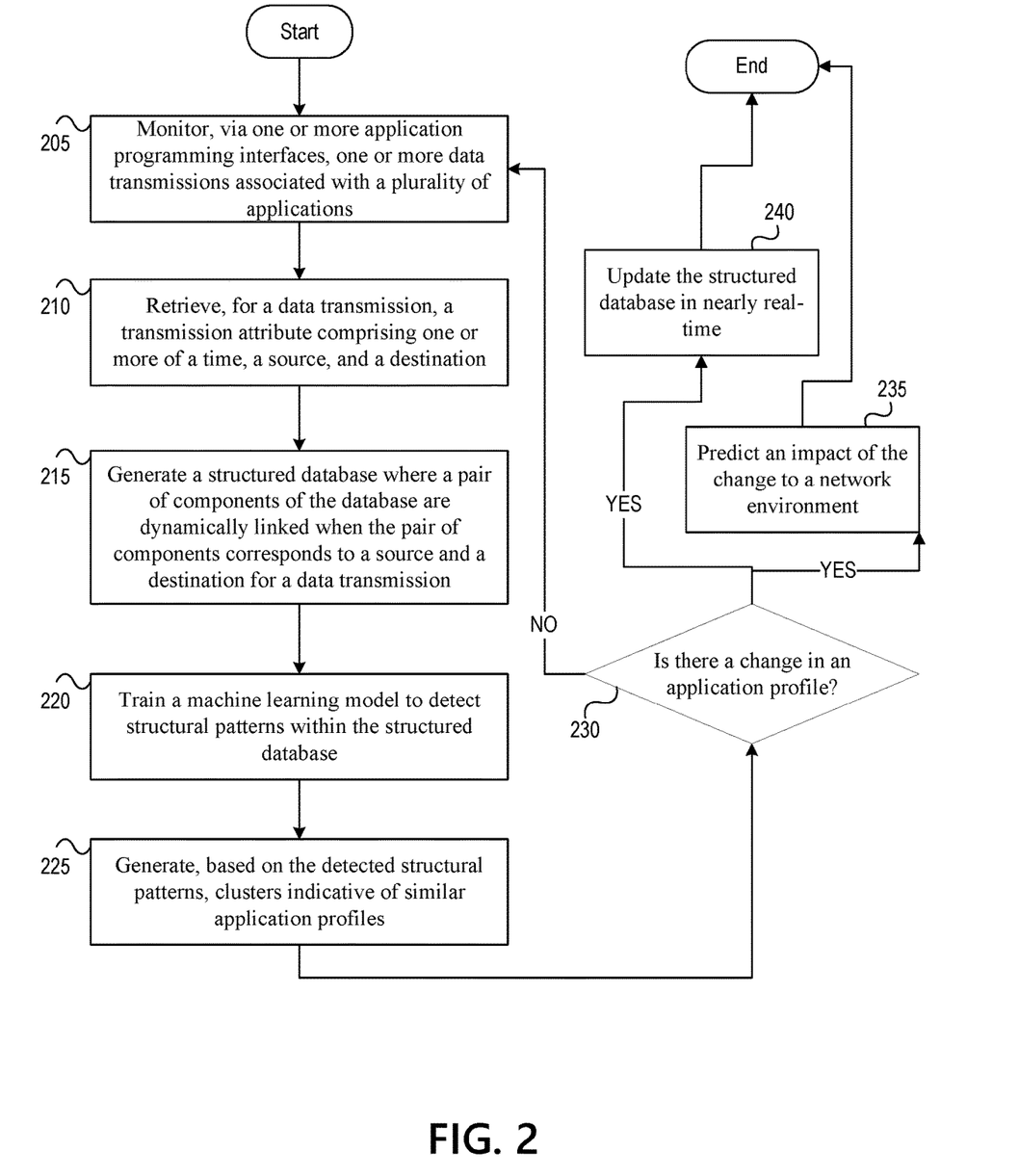
FIG. 2 depicts an illustrative method for enhanced network security based on inter-application data flow diagrams.

FIG. 2 depicts an illustrative method for enhanced network security based on inter-application data flow diagrams. Referring to FIG. 2, at step 205, architecture analysis computing platform 110 having at least one processor, and memory storing computer-readable instructions may monitor, via a computing device and over a network environment and for a plurality of applications, one or more data transmissions associated with the plurality of applications, where the monitoring is performed at one or more application programming interfaces associated with the plurality of applications. Generally, the network environment may refer to a computing environment comprising interconnected network devices. Generally, each application includes one or more API gateways to allow data transmissions to be received and sent. Accordingly, architecture analysis computing platform 110 may monitor, in real-time, the API gateways to detect data transmission.

At step 210, architecture analysis computing platform 110 may retrieve, by the computing device and for a data transmission of the one or more data transmissions, a transmission attribute comprising one or more of a time of the data transmission, a source of the data transmission, and a destination of the data transmission. Generally, the transmission attribute is indicative of one or more properties of a data transmission. For example, a data transmission may be from a word processing application to a database. Accordingly, the word processing application may be a source and the database may be a destination. Also, for example, an IP address of the computing device where an instance of the word application is being run may be part of the transmission attribute. Additional, and/or alternate attributes may be a time of transmission, a time of receipt, intermediate network nodes, and so forth. Generally, even if the actual source and/or destination of a transmission is not identified, it may be sufficient to identify the applications involved in the data transmission.

At step 215, architecture analysis computing platform 110 may generate, by the computing device and based on the transmission attribute, a structured database comprising components and links, where a pair of components of the database are dynamically linked to one another when the pair of components corresponds to a source and a destination for a data transmission between the pair of components. For example, the structured database may generate an architectural model of the data transmission landscape. For example, a data transmission may be between a word processing application and a database. Accordingly, the word processing application and the database may be components in the database, and may be linked together. In some embodiments, the components of the structured database may include one or more of the plurality of applications, databases, memory, CPU, and user interfaces, associated with the plurality of applications. For example, two applications may repeatedly share the same database. Accordingly, the two applications may be connected to the database, and have a one degree of separation between them. Also, for example, two applications may access the same portion of a memory interface. Accordingly, the structured database provides a clear view of an interconnectedness between various network components. In some aspects, architecture analysis computing platform 110 may detect hidden interconnections between applications. In some embodiments, the structured database may be persistent storage. Accordingly, the structured database may be scalable based on a volume of data transmissions, a number of applications, and so forth.

In some embodiments, the structured database may be query-able, and the computing platform may query the structured database for information related to one or more of an application, a suite of applications, a cluster, a security profile, and an application profile. For example, a user may query the structured database to find data inflows and outflows for an application. As another example, a user may query the structured database to find applications that are interconnected. Also, for example, a user may query the structured database to find applications that may utilize a particular API for authentication purposes. Also, for example, a user may query the structured database to find applications that are connected directly to a given application. As another example, a user may query the structured database to find a degree of separation between two applications and/or components of the database. In some embodiments, a user may query the structured database to provide a view of the entire application neighborhood. Also, for example, a user may query the structured database to retrieve all applications that are architecturally similar to a given application.

In some embodiments, the computing platform may update the structured database in nearly real-time. As described herein, the networked environment may be under constant flux. New applications may be added, new databases, memory structures, and so forth may be added, and others may be removed. Accordingly, data transmissions may change, and transmission attributes of data transmissions may change. In some embodiments, architecture analysis computing platform 110 detect such changes, and may update the structured database in nearly real-time.

In some embodiments, architecture analysis computing platform 110 may generate, via the computing device, a visual representation of the structured database, where the visual representation comprises blocks associated with components of the structured database, and an edge between a pair of blocks associated with a link between the pair of components corresponding to the pair of blocks. For example, components of the structured database, such as, for example, the plurality of applications, databases, memory, CPU, and user interfaces, associated with the plurality of applications, may be represented as blocks. In some embodiments, different icons may be utilized for different types of components or blocks. Accordingly, a visual representation of the structured database may be rendered for display. In some embodiments, an open source software application may be utilized to represent the structural information embodied in the structured database. In some instances, the visual representation may be rendered on-demand. For example, when a user requests to view a neighborhood of an application, architecture analysis computing platform 110 may render a portion of the structured database that includes the application and provide a visual display of the neighborhood of the application. The term neighborhood, as used herein, generally refers to components of the structured database that are proximate to the application. In some embodiments, as a user navigates the visual representation, architecture analysis computing platform 110 may render additional, relevant portions of the structured database.

Then, architecture analysis computing platform 110 may provide, via an interactive graphical user interface, the visual representation of the database, where the visual representation comprises zoom-in and zoom-out features. In some embodiments, architecture analysis computing platform 110 may provide the visual representation of the database via an interactive graphical user interface, and a user may be able to zoom in to view additional details, or zoom out to view fewer details. Also, for example, the views may be scaled based on the level of the zoom feature selected by the user.

At step 220, architecture analysis computing platform 110 may train a machine learning model to detect structural patterns within the structured database. For example, an unsupervised learning technique, such as, for example, a K-means clustering technique, or a hierarchical clustering technique, may be utilized to detect patterns in the structured database. For example, two applications may communicate with the same database, use similar APIs for authentication, use similar APIs for web access, communicate with the same applications, and so forth. Accordingly, it is highly likely that the two applications may have similar local neighborhoods. Accordingly, the machine learning model detects such structural patterns to identify applications with a similar application profile. Accordingly, at step 225, architecture analysis computing platform 110 may generate, based on the detected structural patterns, clusters indicative of similar application profiles.

At step 230, architecture analysis computing platform 110 may determine whether there is a change in an application profile of an application of the plurality of applications. For example, an application may have been modified, or a new version of n application may be available. In some instances, an application's security profile may have been modified e.g., if the application has been subjected to a cyberattack). Also, for example, an application may have a different user base. One or more such changes may affect a manner in which the application may interact with the networked environment. For example, the application may not have permission to access a database. Also, for example, a web version of an application may not be available, making those corresponding APIs obsolete. Accordingly, the application profile of the application may change, and architecture analysis computing platform 110 may detect such changes.

Upon a determination that there is no change in an application profile of an application of the plurality of applications, the process may return to step 205 to monitor data transmission. Upon a determination that there is a change in an application profile of an application of the plurality of applications, the process may proceed to step 235 and step 240.

At step 235, architecture analysis computing platform 110 may predict, based on the generated clusters, an impact of the change to the networked environment. For example, when the application profile for a first application changes, then its neighborhood in the structured database may change. Accordingly, architecture analysis computing platform 110 may identify other applications that have similar application profiles as the first application, and predict if their application profiles may also change as a result of changes to the application profile of the first application.

In some embodiments, architecture analysis computing platform 110 may detect, based on the structured database, potential security vulnerabilities. For example, a first application may be subject to a cyberattack. Accordingly, architecture analysis computing platform 110 may identify all components of the structured database that are in a neighborhood of the first application, and evaluate them for potential security vulnerabilities. As another example, architecture analysis computing platform 110 may identify all components that have a similar neighborhood in the structured database, and evaluate them for potential security vulnerabilities. In some instances, firewalls may be automatically configured, access restrictions may be automatically modified, and so forth.

At step 240, architecture analysis computing platform 110 may update the structured database in nearly real-time. As an application profile changes, new connections may emerge. Accordingly, architecture analysis computing platform 110 may update the structured database, and the machine learning model may identify new clusters of components.

Figure 3:
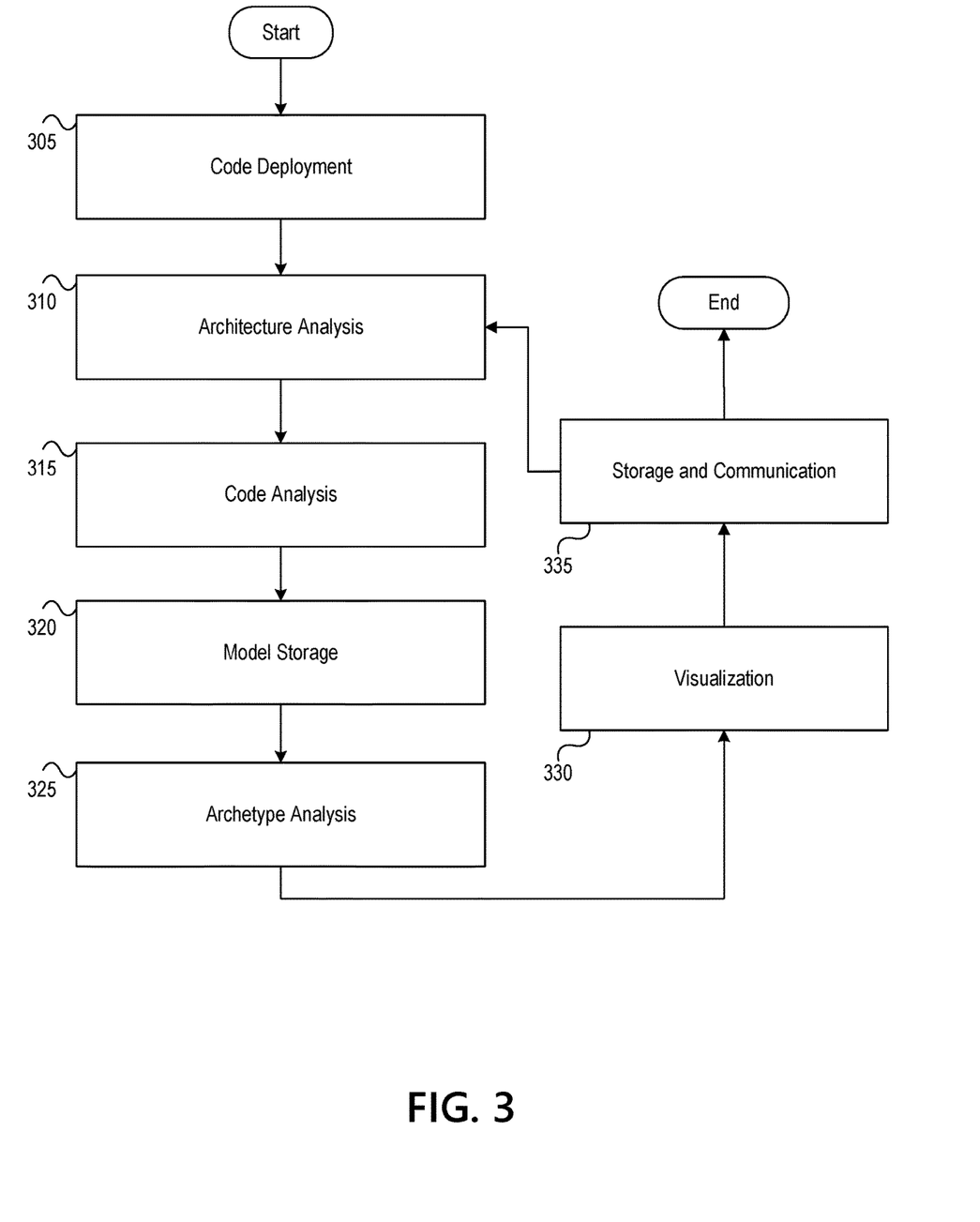
FIG. 3 depicts another illustrative method for enhanced network security based on inter-application data flow diagrams.

FIG. 3 depicts another illustrative method for enhanced network security based on inter-application data flow diagrams. Referring to FIG. 3, at step 305, architecture analysis computing platform 110 having at least one processor, and memory storing computer-readable instructions may detect deployment of software code. For example, software code may be deployed in the production environment. At step 310, architecture analysis computing platform 110 may perform architecture analysis of the software code. For example, an architectural model may be generated based on data inflows and outflows that interconnect the software code to other applications. At step 315, architecture analysis computing platform 110 may analyze the source code. For example, the source code may be analyzed to identify API Gateways associated with the software code. At step 320, architecture analysis computing platform 110 may store the architectural model. For example, the architectural model may be stored in a structured database. At step 325, architecture analysis computing platform 110 may perform archetype analysis. For example, machine learning techniques may be applied to the architectural model to detect patterns among inter-application data transmissions. At step 330, architecture analysis computing platform 110 may provide a visualization of the architectural model. For example, an interactive graphical user interface may be rendered to represent the architectural model. In some instances, such a visualization may be rendered using an open source application. At step 335, architecture analysis computing platform 110 may, based on interactions with the visualization, perform storage and communication operations. In some embodiments, the process may return to step 310.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive commands or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor; and
   memory storing computer-readable instructions that, when executed by the at least one processor, cause the computing platform to:
   monitor, via a computing device and over a network environment and for a plurality of applications, one or more data transmissions associated with the plurality of applications, wherein the monitoring is performed at one or more application programming interfaces associated with the plurality of applications;
   retrieve, by the computing device and for a data transmission of the one or more data transmissions, a transmission attribute comprising one or more of a time of the data transmission, a source of the data transmission, and a destination of the data transmission;
   generate, by the computing device and based on the transmission attribute, a structured database comprising components and links, wherein a pair of components of the database are dynamically linked to one another when the pair of components corresponds to a source and a destination for a data transmission between the pair of components;
   train a machine learning model to detect structural patterns within the structured database;
   generate, based on the detected structural patterns within the structured database, clusters indicative of similar application profiles;
   detect a change has already occurred in an application profile of a first application of the plurality of applications, wherein the first application is part of a first cluster indicative of similar application profiles; and
   predict, based on the generated clusters and the detected change that has already occurred in the first application of the plurality of applications, an impact of a change in an application profile of a second application of the plurality of applications, wherein the second application is part of the first cluster indicative of similar application profiles.

2. The computing platform of claim 1, wherein the instructions comprise additional computer-readable instructions that, when executed by the at least one processor, cause the computing platform to:
   generate, via the computing device, a visual representation of the structured database, wherein the visual representation comprises blocks associated with components of the database, and an edge between a pair of blocks associated with a link between the pair of components corresponding to the pair of blocks; and
   provide, via an interactive graphical user interface, the visual representation of the database, wherein the visual representation comprises zoom-in and zoom-out features.

3. The computing platform of claim 1, wherein the structured database is query-able, and wherein the instructions comprise additional computer-readable instructions that, when executed by the at least one processor, cause the computing platform to:
   query the structured database for information related to one or more of an application, a suite of applications, a cluster, a security profile, an application profile.

4. The computing platform of claim 1, wherein the instructions comprise additional computer-readable instructions that, when executed by the at least one processor, cause the computing platform to:
   update the structured database in nearly real-time.

5. The computing platform of claim 1, wherein the instructions comprise additional computer-readable instructions that, when executed by the at least one processor, cause the computing platform to:
   detect, based on the structured database, potential security vulnerabilities.

6. The computing platform of claim 1, wherein the components of the structured database comprise one or more of the plurality of applications, databases, memory, CPU, and user interfaces, associated with the plurality of applications.

7. The computing platform of claim 1, wherein the instructions comprise additional computer-readable instructions that, when executed by the at least one processor, cause the computing platform to:
detect a change in the networked environment; and
update the structured database based on the detected change.

8. A method, comprising:
at a computing platform comprising at least one processor, and memory:
monitoring, via a computing device and over a network environment and for a plurality of applications, one or more data transmissions associated with the plurality of applications, wherein the monitoring is performed at one or more application programming interfaces associated with the plurality of applications;
retrieving, by the computing device and for a data transmission of the one or more data transmissions, a transmission attribute comprising one or more of a time of the data transmission, a source of the data transmission, and a destination of the data transmission;
generating, by the computing device and based on the transmission attribute, a structured database comprising components and links, wherein a pair of components of the database are dynamically linked to one another when the pair of components corresponds to a source and a destination for a data transmission between the pair of components;
applying a machine learning model to detect structural patterns within the structured database;
generating, based on the detected structural patterns within the structured database, clusters indicative of similar application profiles;
detect that a change has already occurred in an application profile of a first application of the plurality of applications, wherein the first application is part of a first cluster indicative of similar application profiles; and
predicting, based on the detected structural patterns, the generated clusters and the detected change has already occurred in the first application of the plurality of applications, an impact of a change in an application profile of a second application of the plurality of applications, wherein the second application is part of the first cluster indicative of similar application profiles.

9. The method of claim 8, further comprising:
training the machine learning model.

10. The method of claim 8, further comprising:
generating, via the computing device, a visual representation of the structured database, wherein the visual representation comprises blocks associated with components of the database, and an edge between a pair of blocks associated with a link between the pair of components corresponding to the pair of blocks; and
providing, via an interactive graphical user interface, the visual representation of the database, wherein the visual representation comprises zoom-in and zoom-out features.

11. The method of claim 8, wherein the structured database is query-able, and the method further comprising:
querying the structured database for information related to one or more of an application, a suite of applications, a cluster, a security profile, an application profile.

12. The method of claim 8, further comprising:
updating the structured database in nearly real-time.

13. The method of claim 8, further comprising:
detecting, based on the structured database, potential security vulnerabilities.

14. The method of claim 8, wherein the components of the structured database comprise one or more of the plurality of applications, databases, memory, CPU, and user interfaces, associated with the plurality of applications.

15. The method of claim 8, further comprising:
detecting a change in the networked environment; and
updating the structured database based on the detected change.

16. One or more non-transitory computer-readable media storing instructions that, when executed by a computing platform comprising at least one processor, and memory, cause the computing platform to:
monitor, via a computing device and over a network environment and for a plurality of applications, one or more data transmissions associated with the plurality of applications, wherein the monitoring is performed at one or more application programming interfaces associated with the plurality of applications;
retrieve, by the computing device and for a data transmission of the one or more data transmissions, a transmission attribute comprising one or more of a time of the data transmission, a source of the data transmission, and a destination of the data transmission;
generate, by the computing device and based on the transmission attribute, a structured database comprising components and links, wherein a pair of components of the database are dynamically linked to one another when the pair of components corresponds to a source and a destination for a data transmission between the pair of components;
apply a machine learning model to detect structural patterns within the structured database;
generate, based on the detected structural patterns within the structured database, clusters indicative of similar application profiles;
detect a change has already occurred in an application profile of a first application of the plurality of applications, wherein the first application is part of a first cluster indicative of similar application profiles; and
predict, based on the generated clusters and the detected a change has already occurred in the first application of the plurality of applications, an impact of a change in an application profile of a second application of the plurality of applications, wherein the second application is part of the first cluster indicative of similar application profiles.

17. The one or more computer-readable media of claim 16, wherein the instructions comprise additional computer-readable instructions that, when executed by the computing platform, cause the computing platform to:
train the machine learning model.

18. The one or more computer-readable media of claim 16, wherein the instructions comprise additional computer-readable instructions that, when executed by the computing platform, cause the computing platform to:
generate, via the computing device, a visual representation of the structured database, wherein the visual representation comprises blocks associated with components of the database, and an edge between a pair of blocks associated with a link between the pair of components corresponding to the pair of blocks; and provide, via an interactive graphical user interface, the visual representation of the database, wherein the visual representation comprises zoom-in and zoom-out features.

19. The one or more computer-readable media of claim 16, wherein the structured database is query-able, and wherein the instructions comprise additional computer-readable instructions that, when executed by the computing platform, cause the computing platform to:

query the structured database for information related to one or more of an application, a suite of applications, a cluster, a security profile, an application profile.

20. The one or more computer-readable media of claim 16, wherein the instructions comprise additional computer-readable instructions that, when executed by the computing platform, cause the computing platform to:

detect, in nearly real-time, a change in the networked environment; and update the structured database based on the detected change.

\* \* \* \* \*